United States Patent [19]
Rio et al.

[11] 3,925,303
[45] Dec. 9, 1975

[54] FLAMEPROOFING OF ACRYLONITRILE POLYMERS AND COPOLYMERS

[75] Inventors: Andre Rio; Gilbert Vivant, both of Lyon, France

[73] Assignee: Rhone-Poulenc S.A., Paris, France

[22] Filed: Aug. 19, 1974

[21] Appl. No.: 498,431

Related U.S. Application Data
[63] Continuation of Ser. No. 374,098, June 27, 1973, abandoned.

[30] Foreign Application Priority Data
June 30, 1972 France .......................... 72.23796

[52] U.S. Cl. ............. 260/45.7 P; 260/2 P; 260/887; 260/895; 260/898; 260/899; 260/901; 260/928
[51] Int. Cl.$^2$ .......................................... C08K 5/53
[58] Field of Search ........ 260/45.7 P, 898, 2 P, 928, 260/895, 887, 899, 901

[56] References Cited
FOREIGN PATENTS OR APPLICATIONS
1,236,270  6/1960  France ............................ 260/898

*Primary Examiner*—Melvyn I. Marquis
*Attorney, Agent, or Firm*—Stevens, Davis, Miller & Mosher

[57] ABSTRACT

Glycol polyarylphosphonates which consist essentially of a plurality of units of the general formula:

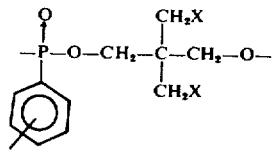

in which R represents a hydrogen atom, a halogen atom, an alkyl radical containing 1 to 4 carbon atoms, or a halogen-substituted alkyl radical containing 1 to 4 carbon atoms, n is equal to 1, 2 or 3 and X represents a halogen atom are provided. They possess good compatibility with acrylonitrile polymers with which they act as flameproofing agents.

8 Claims, No Drawings

FLAMEPROOFING OF ACRYLONITRILE POLYMERS AND COPOLYMERS

This is a continuation of application Ser. No. 374,098, filed June 27, 1973 and now abandoned.

The present invention relates to a process for the production of flameproof compositions based on acrylonitrile polymers or copolymers suitable for the manufacture of synthetic textile fibres or similar structures, as well as the compositions produced by the said process.

The expression "flameproof compositions" as used herein denotes materials which are incapable of supporting a flame until complete combustion has taken place, after they have been set alight and then removed from the source of combustion.

It is known that acrylonitrile polymers are used in numerous applications in the textile field. However, their low resistance to fire prevents them from being used in certain cases. Various methods have been proposed to eliminate or lessen this defect. Thus it is possible to copolymerise acrylonitrile with a flameproofing monomer which contains one or more halogen atoms, such as vinyl chloride or vinylidene chloride. However, in addition to various defects, these copolymers still have insufficient resistance to fire for certain applications. It has also been proposed to incorporate into the acrylonitrile polymers flameproofing adjuvants which are either monomeric or polymeric compounds containing halogen and/or phosphorus. Thus it has been proposed to mix acrylonitrile polymers with polyvinyl chloride or polyvinylidene chloride, or with optionally halogenated phosphates or phosphonates such as bis-(dibromopropyl) dibromopropylphosphonate together with calcium phosphate. Although, in the majority of cases, the solutions obtained make it possible to achieve good resistance to fire, they give rise to other disadvantages such as lack of compatibility between the polymer to be flameproofed and the adjuvant, or the difference in solubility between the polymer and the adjuvant in the solvent used during the spinning of the composition, or the migration or extraction of the adjuvant on heating or in the presence of solvents when the polymers thus flameproofed were used. In short, no satisfactory solution has been found for imparting good fire resistance to acrylonitrile polymers.

According to the present invention there is provided a process for flameproofing polyacrylonitrile or a copolymer of acrylonitrile with 0.5 to 30% by weight of one or more ethylenic comonomers in which 1 to 40% by weight, and preferably 3 to 35% by weight, of a glycol polyphosphonate possessing a plurality of units of the general formula:

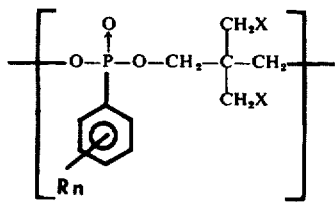

(1)

in which R represents hydrogen, a halogen atom such as chlorine, fluorine or bromine or an alkyl radical containing 1 to 4 carbon atoms, for example, methyl, ethyl or propyl, optionally substituted by a halogen atom such as chlorine or bromine; $n$ represents an integer from 1 to 3 and X represents a halogen atom, preferably a chlorine or bromine atom, is incorporated.

It has been found that polyphosphonates of formula (I), derived from 2,2-bis-(halogenomethyl)-propane-1,3-diol, possess, in addition to their excellent capacity for flameproofing acrylonitrile polymers and copolymers, good compatibility with the latter and good solubility in the solvent employed for spinning these polymers, especially dimethylformamide and dimethylsulphoxide. Moreover, since they are polymeric, the polyphosphonates of formula (I) do not possess the disadvantages of the nonpolymeric adjuvants, such as a tendency to crystallise, to sweat or to volatilise which results in a rapid elimination of the adjuvant and consequent loss in flameproof character.

The use of certain halogenated polyphosphonates has already been recommended for flameproofing polymeric substances. Thus, in French Pat. No. 1,236,270, it has been proposed to incorporate glycol polyhalogenoalkyl or -aryl-phosphonates into compositions based on unsaturated polyesters and vinyl aromatic monomers. However, it is well known in the field of flameproofing that the behaviour of a flameproofing compound depends very much on the polymer concerned so that one cannot forecast the effect of an adjuvant which may or may not be known for its flameproofing character on one type of polymer, on a different type of polymer (see, for example, H. VOGEL "Flammfestrachen von Kunststoffen" 1966, page 23).

The polyphosphonates of formula (I), which form a further aspect of the present invention, can be obtained by various known types of process. Such methods have been described by G. B. BUTLER and K. F. O'DRISCOLL, "Reviews in Macromolecular Chemistry", Volume 2, page 109 et seq. A preferred process consists of reacting substantially equimolecular amounts of an arylphosphonyl dihalide and a 2,2-bis-(halogenomethyl)-propane-1,3-diol. This reaction can conveniently be carried out in bulk, optionally in the presence of catalytic amounts of metal salts such as Mg Cl$_2$, ZnCl$_2$ or CaCl$_2$ at a temperature of between 100 and 300°C, or in solution in an organic solvent such as benzene, optionally in the presence of a stoichiometric amount of a hydracid acceptor such as a tertiary base, for example pyridine. It is also possible to carry out the reaction by poly-condensation of the arylphosphonyl dihalides with the 2,2-bis(halogenomethyl)-propane-1,3-diols at the interface of two solvents for the reagents, which do not mix with one another, i.e. in a heterogeneous phase, and in the presence of a hydracid acceptor, in accordance with the process described in U.S. Pat. No. 3,491,061. According to another process, the polyphosphonates of the present invention can be prepared by reacting a halogenated glycol with a lower alkyl ester of an arylphosphonic acid, especially dimethyl and diethyl esters, preferably continuously removing the lower alkanol resulting from the transesterification.

Suitable arylphosphonyl halides which can be used to prepare the polyphosphonates of formula (I) include by way of example, phenylphosphonyl dichloride, phenylphosphonyl dibromide, p-tolylphosphonyl dichloride, p-tolylphosphonyl dibromide, p-chlorophenylphosphonyl dichloride, m-chlorophenylphosphonyl dibromide and p-bromophenylphosphonyl dibromide. Amongst these compounds, phenylphosphonyl dichloride is very particularly suitable.

2,2-bis-(Chloromethyl)-propane-1,3-diol or 2,2-bis-(bromomethyl)-propane-1,3-diol can be used equally well for the preparation of the polyphosphonates of formula (I).

Regardless of the particular process by which they are produced, the 2,2-bis-(halogenomethyl)-propane-1,3-diol polyphosphonates are in the form of a brown powder. They are soluble in solvents such as dimethylformamide, dimethylacetamide and dimethylsulphoxide.

The molecular weight of the polyphosphonates of formula (I) is not critical for flameproofing acrylonitrile polymers and copolymers. However, it is preferred to use a polyphosphonate of specific viscosity greater than 0.10, measured as a 1% by weight solution in dimethylformamide.

The halogenated polyphosphonates can be incorporated into the acrylonitrile polymers and copolymers in a variety of ways. For example, the polymers, in the solid state in the form of particles of varying dimensions, can simply be mixed. It is also possible to add the phosphorus-containing adjuvant to a solution of the acrylonitrile polymer or copolymer in the usual solvents, for example, dimethylformamide, dimethylacetamide or dimethylsulphoxide or to mix separate solutions of the acrylonitrile polymer and of the polyphosphonate in such solvents.

The acrylonitrile polymers which can be flameproofed by the process of the invention comprise polyacrylonitrile and copolymers, including terpolymers, of acrylonitrile with ethylenic monomers such as acrylic and methacrylic acids, their esters or their amides, for example methyl acrylate, methyl methacrylate and acrylamide; vinyl esters of carboxylic acids, for example vinyl acetate; vinyl halides and vinylidene halides, for example vinyl chloride or vinylidene chloride; heterocyclic vinyl bases such as 2-vinyl-pyridine and 5-methyl-2-vinyl-pyridine; vinyl aromatic monomers such as styrene; diolefines such as butadiene and isoprene; and sulphonic acids carrying ethylenic substituents such as p-styrenesulphonic acid, 4-vinyloxy-benzenesulphonic acid and methallylsulphonic acid.

The following Examples further illustrate the present invention. The resistance to fire of the polymers containing the polyphosphonates of formula (I) was determined on small plates, produced by mixing powders of the polymers, by measuring the limiting oxygen index (LOI TEST) in accordance with Standard Specification ASTM D 2863.

The resistance to fire was also determined by the vertical span or beam test in accordance with Standard Specification ASTM 1230-61 on a 5 × 20 cm. film of thickness 20/100 mm. and also by the semi-circle test in accordance with Standard Specification B.S. 476 on a 2.9 × 56 cm. film of the same thickness as above.

EXAMPLE 1

A. Preparation of 2,2-bis-(bromomethyl)-propane 1,3-diol polyphenylphosphonate.

157.2 g (0.6 mol) of 2,2-bis-(bromomethyl)-propane-1,3-diol are introduced into a 1,000 cm³ cylindrical glass reactor equipped with a stirring system, a heating device, a dropping funnel and a tube for the removal of the gaseous reagents, and are melted by heating at 100°C. 117 g (0.6 mol) of phenylphosphonyl dichloride are then added dropwise, with stirring, over the course of 1 hour. Following the addition, the temperature is gradually raised to 225°C and is kept at this value for two hours, after which it is brought back to 70°C for the purpose of emptying the contents of the flask onto a stainless steel plate. The product is left to cool to ambient temperature and then the solid thus obtained is ground.

The average composition of this product corresponds to that of a compound consisting of recurring units of the formula:

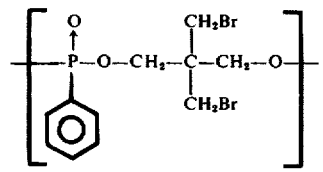

This compouond has a softening point of 60°C and a specific viscosity of 0.2, measured at 25°C as a 1% by weight solution in dimethylformamide. It is soluble in dimethylformamide, dimethylacetamide, dimethylsulphoxide and n-methylpyrrolidone.

The infrared spectrum of this product shows absorption bands at 1,440, 1,250 and 1,050 cm⁻¹, characteristic of $P-C_6H_5$, $P \rightarrow O$ and $P-O-C$ bonds, respectively.

B. Flameproofing.

"L.O.I." Test

Mixtures of varying proportions of the product of (A) and of an acrylonitrile/vinylidene chloride copolymer containing 21% of chlorine are prepared. The powder mixtures thus obtained are sintered in the form of small plates of the following dimensions:

| | |
|---|---|
| length | 100 mm |
| width | 6 mm |
| thickness | 3 mm. |

When these small plates are subjected to the "LOI" test, they give the following indices as a function of their phosphorus content.

| P content % by weight | L.O.I. Index |
|---|---|
| 0 | 24.9 |
| 1.25 | 28.8 |
| 2.5 | 31.8 | b. Vertical span test

A film of an acrylonitrile/vinylidene chloride copolymer containing varying amounts of phosphorus is prepared by pouring a 15% by weight solution, in dimethylformamide, of the polymer and the adjuvant onto a glass support, and then evaporating the solvent at 150°C/0.5 mm Hg. When this film is subjected to the vertical beam test, it has the following characteristics:

| P content % by weight | Surface area burnt in cm² |
|---|---|
| 1.25 | 105 |
| 2.5 | 5.7 | c. Semi-circle test

The film which is subjected to the test is prepared as above. The results given in the following Table are obtained:

| P content % by weight | Length burnt in mm |
|---|---|
| 1.25 | 176 |
| 2.5 | 72.5 |

EXAMPLE 2

The polyphenylphosphonate prepared in Example 1 is incorporated into a 95%/5% by weight acrylonitrile/methyl methacrylate copolymer, and then samples are subjected to the various tests mentioned in Example 1. The following results are obtained:

a. "L.O.I." Index

| P content % by weight | "L.O.I." Index |
|---|---|
| 0 | 20.5 |
| 1.25 | 25.8 |
| 2.5 | 28.6 | b. Vertical span test

| P content % by weight | Surface area burnt in cm² |
|---|---|
| 1.25 | All of it, in 12 seconds |
| 2.5 | 50 | c. Semi-circle test

| P content % by weight | Length burnt in mm |
|---|---|
| 1.25 | 530 |
| 2.5 | 224 |

We claim:

1. In a fire-resistant composition based on polyacrylonitrile or a copolymer of acrylonitrile with 0.5 to 30% by weight of one or more ethylenic comonomers, the improvement wherein the composition comprises 1 to 40% by weight of a glycol polyarylphosphonate, which consists essentially of a plurality of units of the general formula:

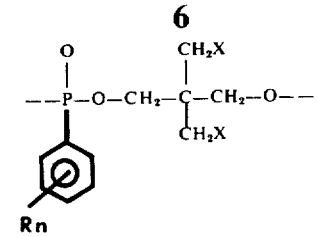

in which R represents a hydrogen atom, a halogen atom, an alkyl radical containing 1 to 4 carbon atoms, or a halogen-substituted alkyl radical containing 1 to 4 carbon atoms, n is equal to 1, 2 or 3 and X represents a halogen atom.

2. A fire-resistant composition according to claim 1, which comprises 1 to 40% by weight of a 2,2-bis-(bromomethyl)-propane-1,3-diol polyphenylphosphonate.

3. A fire-resistant composition according to claim 1 which comprises 3 to 35% by weight of the polyarylphosphonate.

4. A composition according to claim 1, in which R represents hydrogen and X represents a bromine atom.

5. A composition according to claim 1 in which the polyphosphonate has a specific viscosity, measured at 25°C. as a 1% by weight solution in dimethylformamide, greater than 0.10.

6. Process for the preparation of a fire-resistant composition which comprises incorporating 1 to 40% of a polyarylphosphonate which consists essentially of a plurality of units of the formula:

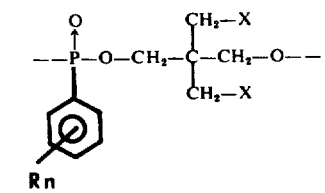

in which R represents a hydrogen atom, a halogen atom, an alkyl radical containing 1 to 4 carbon atoms or a halogen-substituted alkyl radical containing 1 to 4 carbon atoms, n is equal to 1, 2 or 3 and X represents a halogen atom, into an acrylonitrile homo- or copolymer.

7. Process according to claim 6 in which R represents hydrogen and X represents a bromine atom.

8. Process according to claim 6 in which the polyarylphosphonate is incorporated in an amount from 3 to 35% by weight.

* * * * *